Nov. 18, 1924. 1,516,210
J. SAMUELS
EGG BEATER
Filed Nov. 29, 1922 2 Sheets-Sheet 2
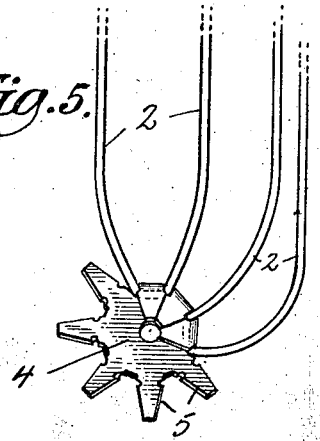
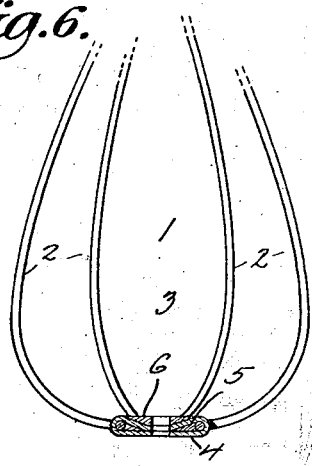
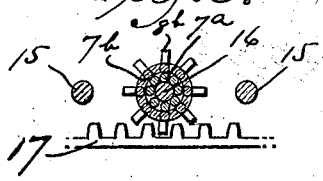
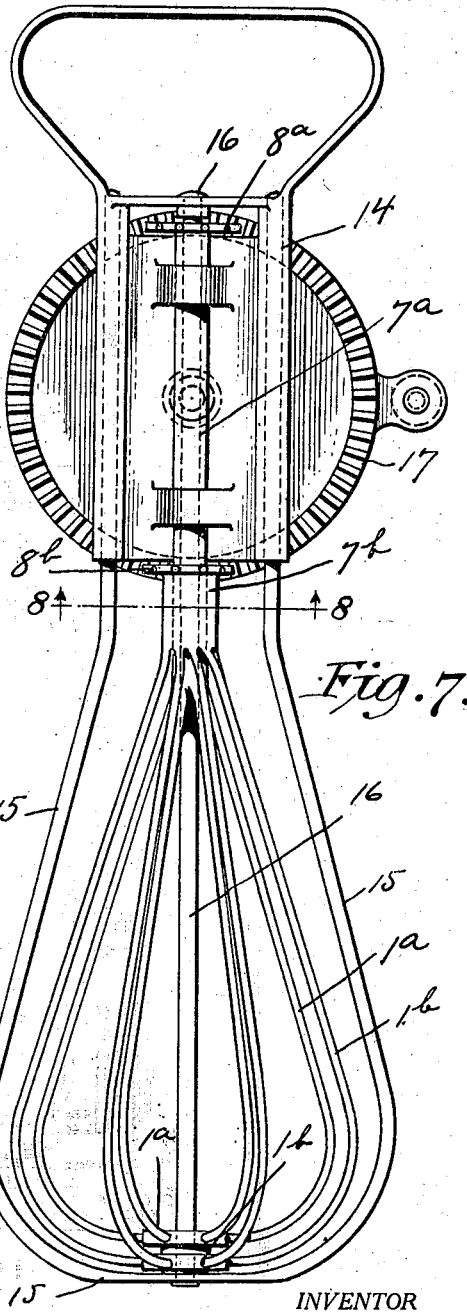
INVENTOR
Julius Samuels
BY
ATTORNEY Patented Nov. 18, 1924.

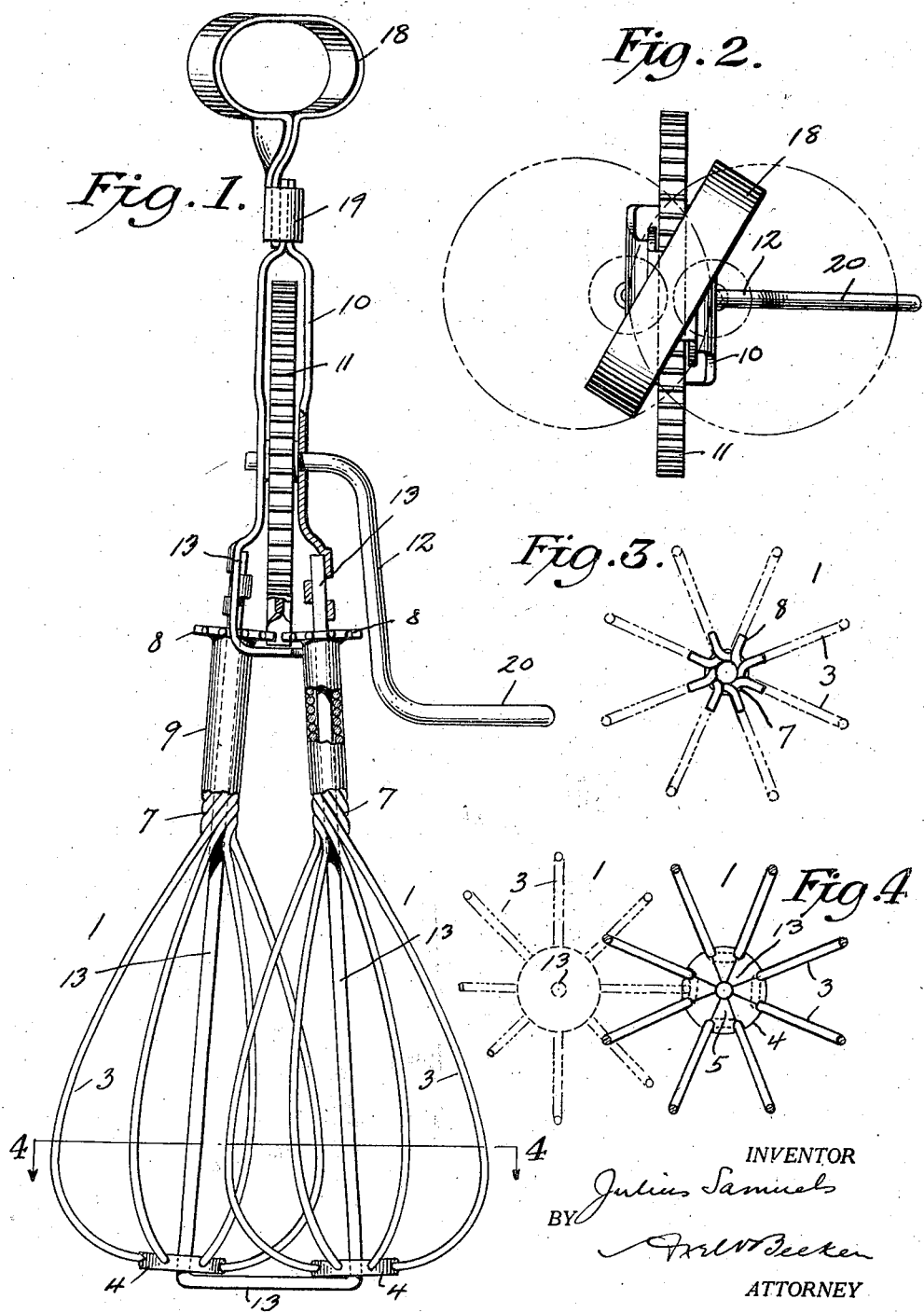

1,516,210

UNITED STATES PATENT OFFICE.

JULIUS SAMUELS, OF NEW YORK, N. Y.

EGG BEATER.

Application filed November 29, 1922. Serial No. 603,892.

*To all whom it may concern:*

Be it known that I, JULIUS SAMUELS, a native of Latvia, and formerly a Russian subject, and a resident of New York city, in the borough of Manhattan, county and State of New York, have invented certain new and useful Improvements in Egg Beaters, of which the following is a specification.

This invention relates to egg beaters or the like and has for its main object and feature the production of a simple and inexpensive structure in which the beater elements are made of wire instead of sheet material as heretofore.

The invention is embodied in several concrete and preferred forms in the accompanying drawings, in which:

Fig. 1 is a general view in elevation, with parts broken away and in section, of one form of egg beater embodying the invention.

Fig. 2 is a top plan view of Fig. 1 with the beater elements indicated diagrammatically.

Fig. 3 is a top plan view of a beater element with the lower cage thereof indicated in dotted lines.

Fig. 4 is a sectional view on the plane of line 4—4 of Fig. 1, showing the plan relation of the two beater elements with respect to each other, one of said elements being indicated in dotted outline.

Fig. 5 is a fragmentary perspective view showing the method of forming the cage of the beater element.

Fig. 6 is a fragmentary vertical section through the cage of one of the beater elements.

Fig. 7 is a view in elevation of an egg beater or the like showing a modified form of the invention.

Fig. 8 is a sectional view on the plane of line 8—8 of Fig. 7.

A beater element 1 is made up by taking a plurality of wire strands 2 and doubling them back upon themselves to form a series of loops constituting a cage 3. This series of loops are suitably featured together as by means of a disk 4 of sheet material having radial projections 5 that are bent inwardly over the loops. If desired a body of solder 6 or other substance may fill the concave portion of the disk after the projections are bent over so as to eliminate interstices in which the material being beaten may lodge. The upper free ends of the wires are then twisted together as at 7 to form a shaft member and in the present instance this shaft member is in the form of a sleeve as shown. If desired the extremity of the wires may be bent outwardly as at 8 to form gear teeth. I have found that a beater element of this construction is advantageous in that the material being beaten detaches itself more readily from round wire than from sheet metal and also that the spiral surface of the shaft 7 tends to throw the material being beaten downwardly and thus diminishes the tendency of said material to remain on the shaft. If desired, however, the interstices between adjacent spirals may be filled with a suitable covering as at 9.

The beater elements thus produced may be embodied in various constructions. Thus in Fig. 1 a framework 10 of any suitable construction is provided in which is mounted a gear 11 rotatable by means of crank 12. Suitably supported in this framework is a substantially U-shaped wire support 13 on each of the legs of which is rotatably mounted a beater element in such relation that the pinions 8 mesh with the teeth of gear 11.

In Fig. 7 another form of the invention is shown. Here framework 14 is provided with a loop guard 15 and carried by this loop guard and the framework is a stem 16. A beater element 1$^a$, constructed as previously described, is formed with a long sleeve 7$^a$ and at its upper end with teeth 8$^a$ meshing with face gear 17 suitably mounted for rotation. Sleeve 7$^a$ surrounds stem 16. A second beater element 1$^b$, constructed as previously described, is provided with a relatively short sleeve 7$^b$ that surrounds the sleeve of the first beater element, and further has teeth 8$^b$ engaging with face gear 17 at a point diametrically opposite to that at which 8$^a$ engages with said gear.

In Figs. 1 and 2 an additional feature of invention is shown. Here a grasping handle 18 having a sleeve 19 is detachably mounted on the upper part of the framework. This handle is in line with gear 11 but in a plane at an angle with respect to the plane of rotation of said gear. In this way the hand of the operator when grasping said handle does not interfere with crank 12 as it rotates, especially as the portion 20 of said crank is not in the plane of handle 18. This construction also tends to oppose the tendency of the device to turn in the hand of the operator when in use.

I claim:

1. A beater element comprising: a plurality of wires bent back upon themselves to form a series of loops constituting a cage and the free ends of the wires being twisted to form a shaft, and a pinion at the end of the shaft formed by bending the extremity of the wires outwardly into gear teeth.

2. A beater element comprising: a plurality of wires bent back upon themselves to form a series of loops constituting a cage, the free ends of the wires being twisted to form a shaft, and a pinion at the end of the sleeve formed by bending the extremity of the wires outwardly into gear teeth.

3. An egg beater or the like comprising: a frame, a substantially U-shaped wire support the free ends of which are mounted in the frame, a gear rotatably mounted in the frame intermediate the free ends of the wire support, two beater elements, one mounted rotatably on one leg and the other on the other leg of the U-shaped wire support, each element consisting of a plurality of wires bent back upon themselves to form a series of loops constituting a cage, the free ends of the wires being twisted to form a sleeve, surrounding one of the legs of the wire support, and a pinion at the end of the sleeve formed by bending the extremity of the wires outwardly into gear teeth, said pinion meshing with the gear carried by the frame.

4. An egg beater or the like comprising: a frame, a substantially U-shaped wire support the free ends of which are mounted in the frame, a gear rotatably mounted in the frame intermediate the free ends of the wire support, two beater elements, one mounted rotatably on one leg and the other on the other leg of the U-shaped wire support, each element consisting of a plurality of wires bent back upon themselves to form a series of loops constituting a cage, the free ends of the wires being twisted to form a sleeve, surrounding one of the legs of the wire support, and a pinion carried by each sleeve and meshing with the gear carried by the frame.

Signed at New York city, in the borough of Manhattan, county and State of New York, this 27 day of November, 1922.

JULIUS SAMUELS